Aug. 4, 1964    R. M. HURD    3,143,691
ELECTRO-OSMOTIC CELL
Filed Nov. 28, 1958

INVENTOR.
RAY M. HURD.
BY

United States Patent Office
3,143,691
Patented Aug. 4, 1964

3,143,691
ELECTRO-OSMOTIC CELL
Ray M. Hurd, Austin, Tex., assignor to Union Carbide Corporation, a corporation of New York
Filed Nov. 28, 1958, Ser. No. 777,068
2 Claims. (Cl. 317—231)

This invention relates to electro-osmotic cells and has particular reference to such cells of improved construction.

Many years ago it was observed that a polar liquid can be caused to pass through a porous solid when an electric current is passed into the liquid. The phenomenon was called "electro-osmosis." It has engaged the attention of electrochemists for many years but little practical commercial use of it has been made. More recently, the converse phenomenon, that is that when polar liquids are forced by pressure through a porous plug, a potential is developed which may be measured, has received the attention of electrochemists. In the past several years attempts have been made to take advantage of this phenomenon, and patents have recently issued on devices utilizing it to measure alternating or transient differential pressures.

Such devices are referred to as "electrokinetic" cells or instruments. Generally they consist of a housing having flexible diaphragms on opposite sides thereof. The housing is divided into two chambers by a porous plug, and the polar liquid is provided in each of the chambers. In each chamber and placed near the porous plug is one of a pair of electrodes with appropriate leads therefrom. When pressure is applied to either of the diaphragms, the liquid in that chamber is forced through the porous plug, and the potential produced can be measured.

It is desirable to provide an electro-osmotic cell, that is, a device by which the flow of a liquid can be produced and controlled, in a nonmechanical way by the application of an electric current to the liquid. When it is attempted to utilize the prior art electrokinetic cell in this way for this purpose, however, it is found that it is inoperative for direct current or low frequency alternating current voltage.

It is the principal object of this invention to provide an electro-osmotic cell in which a controlled flow of liquid can be attained by the application of an electrical signal thereto. More specifically, it is an object of this invention to provide such a cell operable at direct current or low frequency alternating current voltage.

The invention by means of which these objects are achieved will be described with reference to the accompanying drawing in which.

Figure 1:
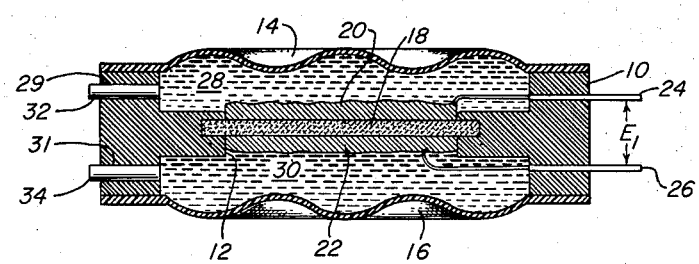
FIG. 1 is a vertical section of an electro-osmotic cell embodying the invention taken along the line 1—1 of FIG. 2 looking in the direction of the arrows.
Figure 2:
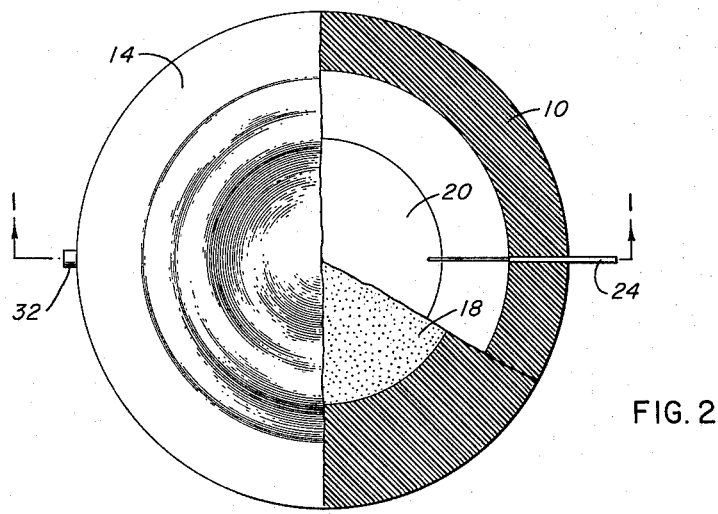
FIG. 2 is a plan view, part being broken away, of the cell of FIG. 1.

The invention comprises an electro-osmotic cell in which self-depolarizing electrodes are provided in each of a pair of chambers containing a polar liquid, the chambers being separated by a porous disc, and each chamber having as one wall thereof a flexible diaphragm. By reason of the self-depolarizing nature of the electrodes the cell of the invention is continuously operative upon the application to the electrodes of a direct current or low frequency alternating current voltage.

Referring to the drawing, the device of the invention may comprise a housing formed of a generally cylindrical main body section 10 which is generally T-shaped in section so as to provide a central aperture 12 therein. Attached, suitably by heat sealing, to opposite sides of the main body section 10 are flexible diaphragms 14, 16. In the aperture 12 is mounted a porous disc 18 suitably of "fritted" or sintered glass, and on each side of the disc 18 and in close proximity thereto is one of a pair of electrodes 20, 22. Leads 24, 26 make contact with the electrodes 20, 22 and extend outwardly of the main body section 10. It will be observed that by this construction two chambers 28, 30 are formed being bounded respectively by the diaphragm 14 and the disc 18 and by the diaphragm 16 and the disc 18. Each of the chambers 28, 30 is filled with a polar liquid. The liquid may be added conveniently through apertures 29, 31 which are later closed by plugs 32, 34.

When a voltage is applied across the leads 24, 26, the polar liquid has a tendency to move through the capillary passages of the porous glass disc 18 toward the negative electrode. This tendency for the liquid to move in that direction is the phenomenon of electro-osmosis. The flow for a given voltage is influenced by certain characteristics of the liquid. These include its viscosity, its dielectric constant and its zeta potential. The zeta potential is that portion of the total potential drop between a liquid and a capillary surface which resides in the movable portion of the liquid. The lower the viscosity, the higher the dielectric constant and the higher the zeta potential, other things being equal, the greater will be the flow for a given voltage.

Accordingly, it will be understood that the selection of a polar liquid as the working fluid for use in the device of the invention is important. Generally speaking, it should have a low viscosity, a high dielectric constant, preferably not less than about 20, and a high zeta potential. Among the liquids which have been used successfully are water, acetone, methanol, ethanol, acetonitrile and propionitrile. Of these, propionitrile is presently preferred. Other liquids having the desired characteristics will suggest themselves to those skilled in the art.

As indicated above, the electrodes used in the device of the invention are vital to its successful operation. They must be self-depolarizing, for if the electrodes become polarized the device will fail to operate. They are composed of a metal and metal ion. Metals to be used for electrodes for the electro-osmotic cell of the invention must have a low over-voltage either for solution or deposition and should be such that the following reactions occur easily and with substantially equal facility, the term "Me" representing any metal, and "e" an electron:

$$Me \rightarrow Me^+ + e$$
$$Me^+ + e \rightarrow Me$$

Suitable metals include silver, thallium, copper, cadmium, and lead. The electrodes fashioned from them may be represented respectively as: $Ag/Ag^+$; $Tl/Tl^+$; $Cu/Cu^{++}$; $Cd/Cd^{++}$; $Pb/Pb^{++}$.

Electrodes for use in the invention must be porous to permit the passage of the working fluid. They may be prepared by reduction or decomposition of the respective oxide. For example, to manufacture silver-silver ion ($Ag/Ag^+$) electrodes, those presently preferred, an aqueous paste of silver oxide ($Ag_2O$) is prepared and placed on a suitable support, for example a silver screen. The paste is heated to dryness and then heated strongly to decompose the oxide and thus provide a porous mass of metallic silver. When the electrodes are placed in a cell in contact with the working fluid, impurities therein result in the production of some silver ion in intimate association with the silver. This may be assured by adding a very small quantity of a salt, for example, silver chloride or sodium chloride, to the working fluid although this is not generally necessary and may be undesirable in some cases.

Figure 3:
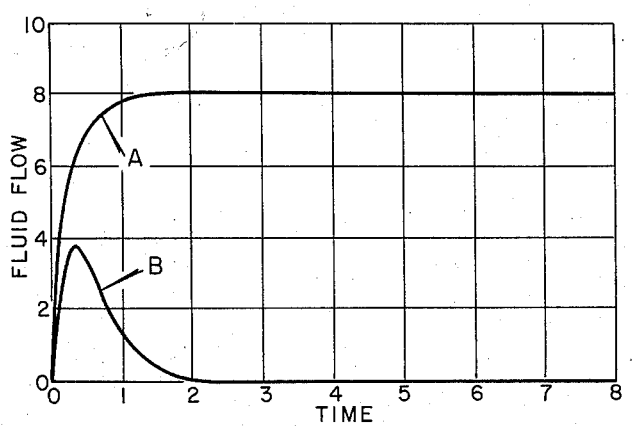
FIG. 3 is a pair of curves showing the nature of the flow response obtained with the cell of the invention and the nature of the flow response obtained with cells of prior art construction.

Reference to FIG. 3 of the drawing will show the significance of the self-depolarizing electrodes. There curves are presented in which the flow of liquid in microliters per second is plotted against time of application in seconds of a voltage across the leads of a cell embodying the invention, curve A having been obtained on a cell using silver-silver ion electrodes prepared as just described and curve B having been obtained on a cell using nondepolarizing electrodes of the prior art. It will be seen that curve A rises steeply to a high level and then remains substantially constant while curve B rises fairly quickly to a low peak and then falls back toward zero.

The housing in which the cell of the invention is assembled is suitably composed of a rigid plastic, preferably one having some degree of resilience. The plastic must be one inert to the working fluid of the cell to avoid contamination. A generally preferred material is polytrifluoromonochloroethylene. If the working fluid is water a polymethyl methacrylate may be used; nylon is equally satisfactory if the working fluid is water or methanol. Polyethylene is another material which may be used.

The porous disc through which the fluid is caused to flow in the cell of the invention may be fabricated of porous glass as has been indicated. This is presently preferred, but it is possible and within the scope of the invention that it be composed of some other material inert to the working fluid. For example, a porous disc of sintered aluminum oxide is satisfactory. Other materials will occur to those skilled in the art. It is pointed out that certain materials, for example closely packed cellulose fibers, have a positive charge. When discs of such materials are employed, the working fluid will flow in the direction of the positive electrode.

It may now be appreciated that the stiffness of the diaphragms and the porosity of the disc will exert an influence on the flow of the liquid, and by predetermining these characteristics of those components, the flow of working fluid from one chamber to the other may be predetermined. It will also be understood that by the movement of liquid from one chamber to the other, a pressure is produced on the diaphragm of that chamber. Thus, pressure is obtained from the passage of electric current.

Many successful cells embodying the invention have been produced. For example, a number of cells utilizing a 30 mm. diameter fritted glass disc of maximum pore size of 4 microns have been produced. The pressure developed on the diaphragm is linear with the voltage applied across the electrodes. Using water as the working fluid, for instance, when a voltage of 0.25 is applied a pressure of about 300 dynes per square centimeter is developed. At 0.5 volt, the pressure developed is just slightly below 600 dynes per square centimeter and at 1 volt the pressure is about 1150 dynes per square centimeter. Usually cells embodying the invention have been produced in a size of 2½ inches diameter and ¾ inch thick. The volume of liquid in the cells is ordinarily about 5 to 10 cubic centimeters.

Cells in accordance with the invention may be and have been used in conjunction with other devices. For example, they may be used to transmit the pressure obtained to a device referred to as a linear detector in which movement of fluid past an appropriate electrode is converted to an electric current. By suitable selection of components, amplification of the original current may be obtained. With a working fluid of desirable conductivity, such as propionitrile, the current utilized by the electro-osmotic cell of the invention can be held to about 30 microamperes at 1 volt applied. The energy input is thus 30 microwatts. When the cell is directly coupled to a linear detector an output of 10 milliamperes across a 100 ohm resistor can be obtained. This is an energy output of 100 milliwatts, a gain of about 330 times the input to the electro-osmotic cell.

I claim:

1. An electro-osmotic cell comprising a housing having flexible diaphragms on opposite sides thereof; a porous disc dividing said housing into a pair of chambers, one wall of each of which is defined by one of said diaphragms; a polar liquid in each of said chambers; and a pair of electrodes mounted one each in said chambers in close proximity to said disc, said electrodes being composed of a metal and metal ion selected from the group of metals and metal ions consisting of silver and silver ion, thallium and thallium ion, copper and copper ion and lead and lead ion, and being self-depolarizing upon the application of a voltage thereto.

2. A cell as defined by claim 1 wherein said electrodes are composed of silver and silver ion.

References Cited in the file of this patent

UNITED STATES PATENTS

| | | |
|---|---|---|
| 2,615,940 | Williams | Oct. 28, 1952 |
| 2,644,900 | Hardway | July 7, 1953 |
| 2,644,902 | Hardway | July 7, 1953 |
| 2,661,430 | Hardway | Dec. 1, 1953 |
| 2,995,714 | Hannah | Aug. 8, 1961 |

OTHER REFERENCES

"Solion" Principle of Electrochemistry and Low-Power Electrochemical Devices, July 16, 1957 (publication date), 46 pages, U.S. Naval Ordnance Laboratory, White Oak, Silver Spring, Md.